OR    3,957,350

United States
Kulpa

[11] 3,957,350
[45] May 18, 1976

[54] DEVICE FOR DISPLAYING A LASER BEAM
[75] Inventor: Stanley M. Kulpa, Chevy Chase, Md.
[73] Assignee: The United States of America as represented by the Secretary of the Army, Washington, D.C.
[22] Filed: Aug. 26, 1974
[21] Appl. No.: 500,839

[52] U.S. Cl. .......................... 350/160 R; 40/130 K; 350/188
[51] Int. Cl.² ..................... G02B 27/00; G02F 1/11; G09F 13/16
[58] Field of Search .......................... 40/130 K, 131; 331/94 K, 94.5; 350/103, 267, 188, 160 P, 160 R, 3.5; 240/84

[56] References Cited
UNITED STATES PATENTS

| | | | |
|---|---|---|---|
| 1,937,957 | 12/1933 | Hotchner | 40/130 K |
| 3,491,237 | 1/1970 | Tillett | 350/188 |
| 3,632,873 | 1/1972 | Henkins | 350/188 |
| 3,637,292 | 1/1972 | Seidel | 350/166 |
| 3,781,111 | 12/1973 | Fletcher et al. | 331/94.5 K |

Primary Examiner—John K. Corbin
Assistant Examiner—B. Wm. de los Reyes
Attorney, Agent, or Firm—Nathan Edelberg; Robert P. Gibson; Saul Elbaum

[57] ABSTRACT

Described herein is a system for producing scattered monochromatic radiation. The system comprises a planar material having surface irregularities which are brightly illuminated by the use of a laser radiation source directed parallel to the planar surface so as to graze the surface irregularities with incident radiation. The size of the surface irregularities are designed so as to be large enough to partially scatter the incident radiation while being small enough to permit a substantial portion of the radiation to pass through. A variety of embodiments are described including an arrangement to illuminate a recognizable shape or pattern, and arrangement to illuminate fluid or other droplets disbursed upon a base surface, and arrangement to illuminate the effect of external stimuli (such as acoustic vibrations applied to the surface of the base material) and finally, a coordinate system using two non-parallel laser beams.

8 Claims, 4 Drawing Figures

DEVICE FOR DISPLAYING A LASER BEAM

BACKGROUND OF THE INVENTION

This invention relates generally to a system for producing scattered monochromatic radiation, and more specifically to an arrangement for brightly illuminating granular irregularities on the planar surface by the use of a laser beam.

It has always been a problem in the prior art to clearly and brilliantly display and photograph the output of a laser beam. Standard prior art approaches to the problem include the use of atmospheric aerosol scattering techniques as well as the use of colloidal solutions. Neither of these techniques is satisfactory. In the case of atmospheric aerosol scattering intensities are normally quite small and not easily detectable. A colloidal solution, on the other hand, requires the use of a transparent tank and also tends to scatter and absorb such a great extent of the input radiation as to significantly reduce the available thru-put radiation.

It is, therefore, a primary object of this invention to provide a system for producing scattered monochromatic radiation.

A more particular object of the invention is to produce scattered monochromatic radiation which is brilliant and easily detectable.

An additional object of the invention is to provide for an illuminated laser beam without the necessity for transmitting such beam through a colloidal solution or aerosol atmosphere.

Yet another object of the invention is to provide brilliantly illuminated monochromatic light in a recognizable form or shape.

An additional object is to accurately illuminate fluid droplets which are disbursed on the surface of a planar base material.

An additional object is to clearly illuminate irregularities on the surface of a base material which have been produced by action of external physical stimuli.

Still another object of the invention is to provide for an x–y coordinate system utilizing two laser beams.

These and other objects of the invention will become more apparent with reference to the appended specification and drawings relating thereto in which:

FIG. 1 is a side view of one embodiment of the present invention.

FIG. 2 illustrates a side view of a second embodiment of the invention.

FIG. 3 illustrates another embodiment of the invention.

FIG. 4 illustrates yet another embodiment of the present invention.

SUMMARY OF THE INVENTION

Briefly, in accordance with this invention, the system for producing scattered monochromatic radiation comprises a planar base material having surface irregularities thereon which are brilliantly illuminated by a laser radiation beam which is directed parallel to the planar surface so as to graze the surface irregularities with incident radiation. The size of the surface irregularities are designed to be sufficient to partially scatter the incident radiation without totally blocking the same. These irregularities can generally consist of a granular substance which is dispersed throughout the surface of the planar base in a uniform irregular fashion or in a recognizable form or shape. The irregularities may also comprise fluid droplets, or the like, which are dispersed on the surface. External stimuli which are produced by the action of a transducer can also create the kind of surface irregularities which will be brightly illuminated in accordance with this invention. The system may also be utilized in an x–y coordinate arrangement to select predetermined points on a map or similar arrangement.

DESCRIPTION OF THE DRAWINGS

The invention can be best understood with reference to the drawings in which.

Laser 10 directs a beam of monochromatic light 20 so as to graze surface irregularities 31 of base material 30. Base material 30 can be made of any well known substance, such as, for example, rubber, plastic, or the like. Surface irregularities 31 can generally consist of any of a variety of well known granules, such as sand, grass, rubber, etc. The examples given here are merely illustrative and are not intended to limit the scope of the present invention since persons having ordinary skill in the art will have no difficulty in conceiving of a multitude of materials and granules as the case may be.

Figure 1:
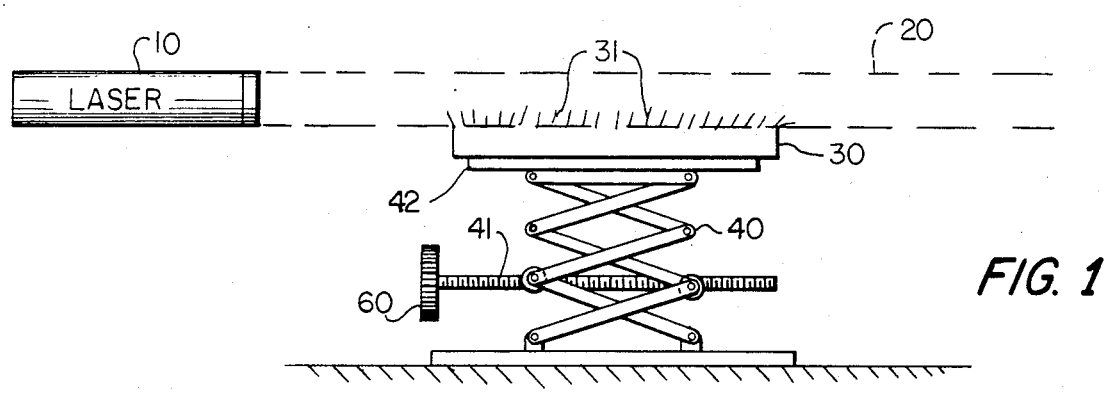
FIG. 1 illustrates a side view of one embodiment of the present invention.

In the arrangement illustrated in FIG. 1, a system is shown for ensuring that the laser beam is securedly parallel with the planar surface 30. The arrangement comprises a platform 42 which is connected to a conventional scissors arrangement 40 for raising and lowering the platform. Control shaft 41 and turn handle 60 provide the well known elevator action necessary to ensure leveling. Here again, the arrangement shown is merely illustrative and is not intended to be limiting in any manner.

Figure 2:
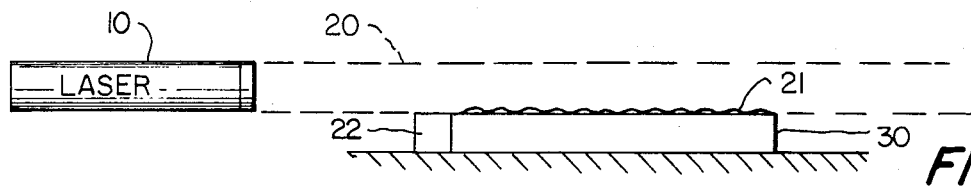

FIG. 2 illustrates the situation where the surface irregularities are created by external forces such as the action of acoustic, thermal or electric stimulation. Base 30 is again illuminated by the parallel action of laser 10 directing the beam 20 across its surface. Surface irregularities 21 are created by the action of transducer 22 which causes vibration of surface 30 due to some external stimuli.

Figure 3:
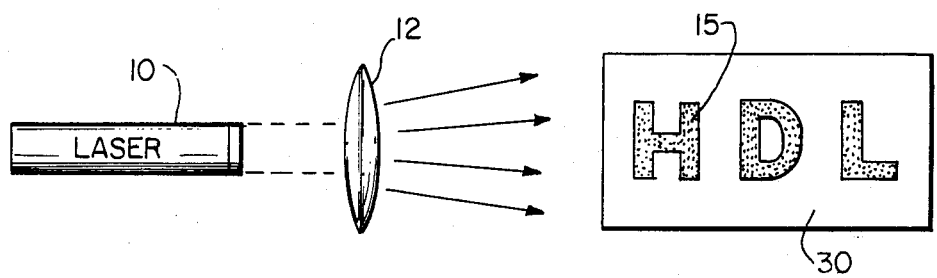

The embodiment illustrated in FIG. 3 illustrates the use of the invention as a technique for brilliantly illuminating the desired shape or form. The letters HDL are set off from base 30 by the provision of uniformly dispersed granules 15. These granules can be of any desired form as previously mentioned, and preferably for the present embodiment, the granules should advantageously consist of fluorescent crystals dispersed in the desired format. In order to achieve uniform illumination over a wide area, laser 10 is directed onto a conventional lens 12 which directs the monochromatic beam over a wide enough area so as to adequately cover the entire width of planar surface 30.

Figure 4:
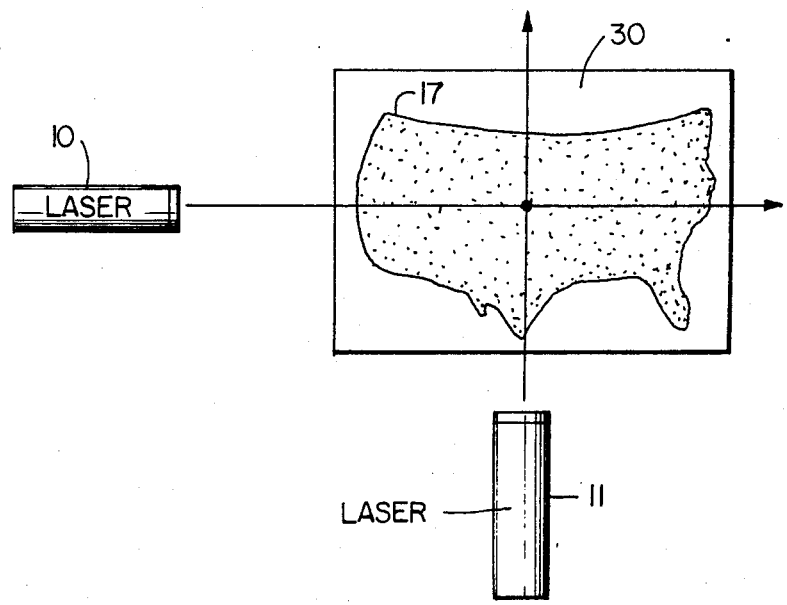

Referring to FIG. 4, the use of two layers 10 and 11 illustrate how the present invention can provide a coordinate system. A predetermined map in the shape 17 is offset from base 30 by virtue of its high granularity. As lasers 10 and 11 streak across the granular surface 30, they intersect at a variety of different locations on the map. Thus, any desired location on the map can be pinpointed by the simultaneous action of two laser beams.

While surface irregularities in the nature of granules have been mentioned, it will be appreciated that any form of surface irregularities can be brilliantly illuminated with monochromatic light in accordance with this invention. Thus, the fluid droplets which have been dispersed on the surface of a planar base will also brilliantly disperse the incident monochromatic radiation. Additional uses of the present invention can easily come to mind. Thus, the invention has obvious application for use as an aircraft approach illumination system. Monochromatic radiation skimming along the ground of an aircraft approach area can brilliantly light up the area and provide accurate guidance for the aircraft pilot.

It will be appreciated that a variety of uses and examples have been illustrated with respect to the present invention. However, it should be noted that these are merely exemplary and constitute a small portion of the wide variety of ultimate uses to which the present invention can be put. It is, therefore, desired that the invention not be limited to the details shown and described for obvious modifications will surely occur to persons skilled in the art.

I claim as my invention:

1. A system for producing scattered monochromatic visible radiation comprising:
   a. planar base material having irregularities on an external surface thereof; at least one source of laser radiation directed along said external surface of said planar base so as to graze the surface irregularities with incident radiation; the size of said surface irregularities being sufficient to partially scatter the incident radiation, whereby scattered monochromatic visible radiation is produced.

2. The system defined in claim 1 wherein said irregularities consist of a granular substance uniformly dispersed through the surface area.

3. The system defined in claim 1 wherein said irregularities are dispersed on said surface to form a recognizable shape and said laser source causes illumination of said shape.

4. The system defined in claim 1 wherein said irregularities comprise fluid droplets dispersed on the surface of said base.

5. The system defined in claim 1 further including external stimulation means for producing said irregularities.

6. The system defined in claim 5 wherein said external stimulation comprises an acoustic transducer for causing surface vibration on said base.

7. The system defined in claim 1 wherein said irregularities comprise fluorescent crystals.

8. The system defined in claim 1 further comprising at least two laser beams perpendicularly disposed for locating a particular point of irregularity on the coordinate system.

* * * * *